United States Patent
Liu et al.

(10) Patent No.: US 12,347,297 B2
(45) Date of Patent: Jul. 1, 2025

(54) METHOD AND SYSTEM FOR AR-BASED GRADED MANAGEMENT EDUCATION OF LABORATORY SAFETY RISK

(71) Applicant: China Academy of Art, Hangzhou (CN)

(72) Inventors: Zheng Liu, Hangzhou (CN); Zhixiang Zhao, Hangzhou (CN)

(73) Assignee: China Academy of Art, Hangzhou (CN)

( * ) Notice: Subject to any disclaimer, the term of this patent is extended or adjusted under 35 U.S.C. 154(b) by 326 days.

(21) Appl. No.: 18/051,341

(22) Filed: Oct. 31, 2022

(65) Prior Publication Data
US 2024/0112558 A1    Apr. 4, 2024

(30) Foreign Application Priority Data
Sep. 28, 2022    (CN) .......................... 202211193446.1

(51) Int. Cl.
*G06V 10/48*    (2022.01)
*G06V 10/20*    (2022.01)
(Continued)

(52) U.S. Cl.
CPC ....... *G08B 21/0225* (2013.01); *G06V 10/255* (2022.01); *G06V 10/26* (2022.01);
(Continued)

(58) Field of Classification Search
CPC .... G08B 21/0225; G08B 21/02; G08B 31/00; G06V 10/255; G06V 10/26; G06V 10/48;
(Continued)

(56) References Cited

U.S. PATENT DOCUMENTS

| 2007/0104358 A1* | 5/2007 | Komatsu ................ G06V 10/48 382/199 |
| 2020/0065584 A1* | 2/2020 | Lyer .......................... G06T 7/70 |

(Continued)

OTHER PUBLICATIONS

Kim et al., Image-based construction hazard avoidance system using augmented reality in wearable device, 2017, Automation in Construction, 83 (2017): 390-403. (Year: 2017).*

(Continued)

*Primary Examiner* — Kathleen M Broughton
(74) *Attorney, Agent, or Firm* — Schwegman Lundberg & Woessner, P.A.

(57) ABSTRACT

A method and system for AR-based graded management education of laboratory safety risk are provided, which includes following steps: collecting laboratory image data and sensor data and obtaining a risk grade matching rule of a laboratory; identifying image feature data of the image data and sensor feature data of the sensor data, converting matched image feature data into a laboratory equipment name and converting matched sensor feature data into an equipment model; inputting the equipment name and a corresponding equipment model and quantity into the risk grade matching rule of the laboratory, and outputting a risk grade of a current laboratory according to the risk grade matching rule of the laboratory; and fusing and matching a AR template image corresponding to the identified and output risk grade and real image information according to preset AR template images for various risk grades, so as to output alarm information.

8 Claims, 1 Drawing Sheet

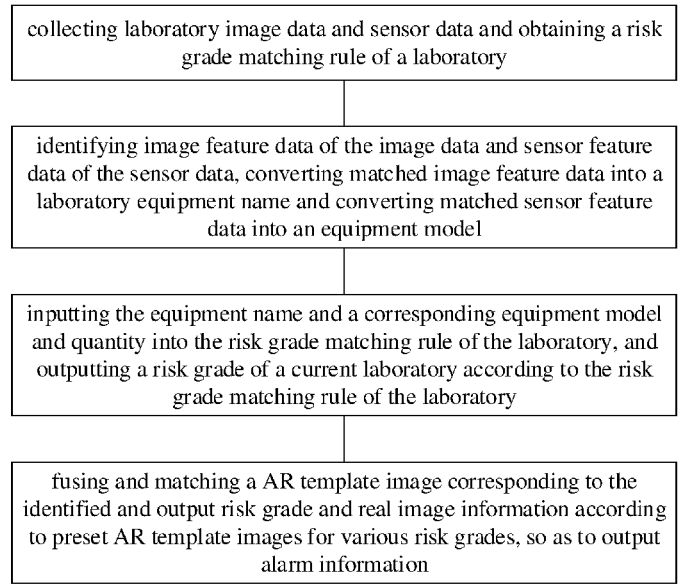

(51) Int. Cl.
| | |
|---|---|
| *G06V 10/26* | (2022.01) |
| *G06V 10/75* | (2022.01) |
| *G06V 10/764* | (2022.01) |
| *G06V 10/77* | (2022.01) |
| *G06V 10/80* | (2022.01) |
| *G06V 20/20* | (2022.01) |
| *G08B 21/02* | (2006.01) |

(52) U.S. Cl.
CPC ............ *G06V 10/48* (2022.01); *G06V 10/751* (2022.01); *G06V 10/764* (2022.01); *G06V 10/7715* (2022.01); *G06V 10/806* (2022.01); *G06V 20/20* (2022.01)

(58) Field of Classification Search
CPC ............... G06V 10/751; G06V 10/764; G06V 10/7715; G06V 10/806; G06V 10/44; G06V 20/20; G06Q 10/0635; G06Q 10/06393
See application file for complete search history.

(56) References Cited

U.S. PATENT DOCUMENTS

| | | | |
|---|---|---|---|
| 2020/0117903 A1* | 4/2020 | Goel | G06V 20/35 |
| 2021/0216773 A1* | 7/2021 | Bohannon | G06V 20/20 |

OTHER PUBLICATIONS

Song et al., Research on image segmentation algorithm based on threshold, 2021, 13th International Conference on Measuring Technology and Mechatronics Automation, pp. 1-4. (Year: 2021).*

Wang et al., AR for enhanced visual inspection through knowledge-based deep learning, 2020, Structural Health Monitoring, 20(1): 426-442. (Year: 2020).*

Selfozzakerini et al., Hough Transform Implementation for Event-Based Systems, 2018, Frontiers in Computational Neuroscience, 2018(12): pp. 1-18. (Year: 2018).*

Wang et al., Improved Registration Algorithm Based on Double Threshold Feature Extraction and Distance Disparity Matrix, 2022, Sensors, 22(6525): 1-14. (Year: 2022).*

Nadeem et al., AR-LabOr: Design and Assessment of an Augmented Reality Application for Lab Orientation, 2020, Education Sciences, 10 (316): 1-30. (Year: 2020).*

Plunkett, Simple and Practical Method for Incorporating Augmented Reality into the Classroom and Laboratory, 2019, J. Chem Edu. (96): 2628-2631. (Year: 2019).*

Schiano Lo Moriello, On the Suitability of Augmented Reality for Safe Experiments on Radioactive Materials in Physics Educational Applications, 2022, IEEE Digital Object Identifier, (10): 54185-54196. (Year: 2022).*

* cited by examiner

```
┌─────────────────────────────────────────────────────────────┐
│ collecting laboratory image data and sensor data and        │
│ obtaining a risk grade matching rule of a laboratory        │
└─────────────────────────────────────────────────────────────┘
                              │
┌─────────────────────────────────────────────────────────────┐
│ identifying image feature data of the image data and sensor │
│ feature data of the sensor data, converting matched image   │
│ feature data into a laboratory equipment name and converting│
│ matched sensor feature data into an equipment model         │
└─────────────────────────────────────────────────────────────┘
                              │
┌─────────────────────────────────────────────────────────────┐
│ inputting the equipment name and a corresponding equipment  │
│ model and quantity into the risk grade matching rule of the │
│ laboratory, and outputting a risk grade of a current        │
│ laboratory according to the risk grade matching rule of the │
│ laboratory                                                  │
└─────────────────────────────────────────────────────────────┘
                              │
┌─────────────────────────────────────────────────────────────┐
│ fusing and matching a AR template image corresponding to    │
│ the identified and output risk grade and real image         │
│ information according to preset AR template images for      │
│ various risk grades, so as to output alarm information      │
└─────────────────────────────────────────────────────────────┘
```

METHOD AND SYSTEM FOR AR-BASED GRADED MANAGEMENT EDUCATION OF LABORATORY SAFETY RISK

CROSS REFERENCE TO RELATED APPLICATION

This Non-provisional application claims priority under 35 U.S.C. § 119(a) to Chinese Patent Application No. 202211193446.1, filed on 28 Sep. 2022, the entire contents of which is hereby incorporated by reference in its entirety.

BACKGROUND ART

At present, all colleges and universities may open laboratories for scientific researches. However, at present, there are a lot of flammable, explosive, toxic and harmful experimental materials in laboratories, and safety education of researchers in traditional laboratories is not enough, which leads to frequent laboratory safety problems. Safety risk factors exist objectively in laboratories of the colleges and universities, but some of the colleges and universities pay no attention to laboratory safety, and lacking of relevant laws and regulations, lacking of safety management professionals and extensive management of dangerous sources also lay hidden danger for the laboratory safety. At present, safety education for the laboratory is only made by giving oral education explanation to a number of students by professional teachers, but effect of actual education explanation is poor due to lack of effective interaction with the laboratory, and the students usually can't fully understand rules and purposes of laboratory safety education. Especially, there are complicated rules for laboratory education aiming at different safety risk grades, and with existing oral explanation, it is difficult for the students to deeply understand operation modes for different safety risk grades.

SUMMARY

One of objects of the present disclosure is to provide a method and system for AR-based graded management education of laboratory safety risk. In the method and system, AR technology combined with grading rules of laboratory risk management are utilized, mutually matched image features with various risk grades are identified and combined with risk warnings for visual display and education, thus providing intuitive, effective and interactive graded education of the laboratory safety risk for students and laboratories, and improving effect of laboratory safety education.

Another object of the present disclosure is to provide a method and system for AR-based graded management education of laboratory safety risk. In the method and system, communication connection is established with multiple sensors, sensor data is collected in real time and combined with the laboratory's own safety risk grading rules, so as to obtain visual alarms and instructions corresponding to safety risk grades in combination with sensor data analysis, so that the AR technology can be used to display parametric non-intuitive safety risk rules in an intuitive way, thereby improving the effect of laboratory safety education.

Another object of the present disclosure is to provide a method and system for AR-based graded management education of laboratory safety risk. In the method and system, a correct matching relationship can be maintained by accurately measuring a position and pose of a camera relative to a real world by 3D registration technology, and a position and pose of a virtual-world object in a real-world coordinate system is calculated with a transformation relation matrix, which can improve matching accuracy and risk-grade education effect.

In order to achieve at least one of the above objects, a method for AR-based graded management education of laboratory safety risk is further provided in the present disclosure, which includes:

collecting laboratory image data and sensor data and obtaining a risk grade matching rule of a laboratory;

identifying image feature data of the image data and sensor feature data of the sensor data, converting matched image feature data into a laboratory equipment name and converting matched sensor feature data into an equipment model;

inputting the equipment name and a corresponding equipment model and quantity into the risk grade matching rule of the laboratory, and outputting a risk grade of a current laboratory according to the risk grade matching rule of the laboratory; and fusing and matching a AR template image corresponding to the identified and output risk grade and real image information according to preset AR template images for various risk grades, so as to output alarm information.

According to one of preferred embodiments of the present disclosure, a method for identifying the image data includes: firstly defining a gray threshold T using a gray threshold segmentation method, in which $f(x,y)$ represents a pixel value of a point $(x,y)$, and $g(x,y)$ represents a segmented image; and further performing feature extraction on the segmented image $g(x,y)$.

According to another preferred embodiment of the present disclosure, a method for performing the feature extraction includes: performing feature extraction on the segmented image $g(x,y)$ by using a Hough transform, selecting any point $(a,b)$ within a shape of the segmented image $g(x,y)$ as a reference point, and then calculating a tangent direction and an offset vector r to a position of the reference point $(a,b)$ and an included angle $\alpha$ between r and an x axis, from each point on an edge of a graph of an arbitrary shape. A method of calculating the reference point $(a,b)$ is as follows:

$$a = x + r(\phi)\cos(\alpha(\phi))$$

$$b = x + r(\phi)\sin(\alpha(\phi)).$$

According to another preferred embodiment of the present disclosure, after the feature extraction is completed, a classifier is further configured to classify extracted features. A classification method includes:

calculating a total number M of classes of current equipment samples, a current sample class extracted from the sample library being $w_i = \{1, 2, \ldots, M\}$, a prior probability of the current sample being expressed as $P(w_i)$ and a class conditional probability density of the current sample being expressed as $P(x|w_i)$; calculating a posterior probability $P(w_i|x)$ of the current sample by using a Bayesian formula, a class corresponding to a maximum value of the posterior probability being a final classified class, j representing a subscript of a summation term, n being the total number of classes of the equipment, where the posterior probability $P(w_i|x)$ is calculated as follows:

$$P(w_i | x) = \frac{P(x | w_i)P(w_i)}{\sum_{j=0}^{n} P(x | w_j)P(w_j)}.$$

According to another preferred embodiment of the present disclosure, the risk grade rule of the laboratory includes: establishing equipment classes and quantities for various risk grades, calculating equipment classes corresponding to all of the image feature data in a laboratory image identified by the classifier; and if an equipment class identified by the classifier completely cover an equipment class and quantity for a corresponding risk grade, determining that a current laboratory scene is a laboratory matched with covered risk grade rules, and outputting an AR template image corresponding to the risk grade of the laboratory so as to be fused with a real laboratory image.

According to another preferred embodiment of the present disclosure, the risk grade rule of the laboratory includes a decision rule for various priorities, and the decision rule for various priorities includes: establishing a first priority risk grade rule and a second priority risk grade rule; and if the equipment class and quantity identified in the collected laboratory image data not only cover an equipment class and quantity corresponding to the first priority risk grade rule, but also cover an equipment class and quantity corresponding to the second priority risk grade rule, the first priority risk grade being higher than the second priority risk grade, directly calling an AR template image corresponding to the first priority risk grade to be fused with the real laboratory image.

According to another preferred embodiment of the present disclosure, the risk grade rule of the laboratory includes: collecting sensor data, setting a risk grade range of sensor values, and if a collected current sensor value is at a corresponding risk grade, and the equipment class and quantity in the image obtained by the classifier match a same risk grade in the grade range where the sensor data is located, directly outputting a corresponding AR module image with a same risk grade to be fused with the real laboratory image.

According to another preferred embodiment of the present disclosure, the risk grade rule of the laboratory includes: collecting sensor data, setting a risk grade range of sensor values, and if there is difference between a corresponding risk grade where the collected current sensor value is located and a risk grade determined by the equipment class and quantity in the image obtained by the classifier, selecting a risk grade with higher priority to output an AR module image corresponding to the risk grade to be fused with the real laboratory image.

In order to achieve at least one of the above objects, a system for AR-based graded management education of laboratory safety risk is further provided in the present disclosure, which executes the method for AR-based graded management education of laboratory safety risk.

The present disclosure further provides a computer-readable storage medium with a computer program stored therein, and the computer program can be executed by a processor to implement the method for AR-based graded management education of laboratory safety risk.

BRIEF DESCRIPTION OF THE DRAWINGS

FIG. 1 shows a flow chart of a method for AR-based graded management education of laboratory safety risk according to the disclosure.

DETAILED DESCRIPTION

The following description is intended to disclose the present invention so as to enable those skilled in the art to implement the invention. The embodiments in the following description are by way of example only, and other obvious variations will occur to those skilled in the Art. The basic principle of the invention defined in the following description can be applied to other implementations, modified, improved and equivalent schemes and other schemes without departing from the spirit and scope of the utility model.

It can be understood that the term "a or an" should be understood as "at least one" or "one or more", that is, in one embodiment, the number of an element may be one, while in other embodiments, the number of the element may be multiple, and the term "an" cannot be understood as limiting the number.

With reference to FIG. 1, a method for AR-based graded management education of laboratory safety risk is provided in this disclosure. The method mainly includes following steps. Firstly, it is necessary to determine a risk grade rule of a laboratory, and features related to a risk grade is extracted according to relevant risk grade instructions of the laboratory. Further, the camera is used to collect image information of the laboratory. The camera can be provided in multiple, so that the image information of the laboratory can be observed from multiple perspectives, so that more laboratory equipment features can be distinguished, and grade risk assessment of the laboratory can be more accurate. Image recognition technology is configured to identify the equipment class and corresponding equipment quantity for each same laboratory image. Further, equipment classes and equipment quantities corresponding to some of the risk grades are preset, a risk grade of the identified laboratory image is obtained in a matching manner, and a preset AR template corresponding to a risk grade is called to be fused with a real laboratory image, and the fused image exhibits alarm information and teaching information.

Specifically, after the camera acquires the laboratory image, the image may be further gray segmented with a gray segmentation method. A gray threshold T is preset with the gray segmentation method, and gray values of all pixels in a current image are further calculated, in which $f(x,y)$ is defined as a pixel value of a pixel $(x,y)$, and the pixel $f(x,y)$ larger than the gray threshold is segmented to obtain the segmented image $g(x,y)$. After image segmentation is completed, feature extraction is further carried out on the segmented image. In the disclosure, A Hough transform method is preferably adopted to extract features of the segmented image. Graphic features for a boundary with an arbitrary shape can be detected by the Hough transform. Firstly, any point $(a,b)$ within the shape is selected as the reference point, and then a tangent direction and an offset vector r to a position of the reference point $(a,b)$ and an included angle $\alpha$ between r and an x axis are calculated from each point on an edge of a graph of the arbitrary shape. A position of the reference point $(a,b)$ can be calculated with the following formula:

$$a = x + r(\phi)\cos(\alpha(\phi))$$

$$b = x + r(\phi)\sin(\alpha(\phi)).$$

After corresponding features are extracted for the segmented image with the Hough transform, the features are further classified. In the disclosure, the extracted features are preferably classified using a Bayesian classifier, in which the equipment is divided into M classes in advance, and each equipment has a corresponding standard feature, which is used to construct a feature library for equipment sample classes, and a sample of a current class is expressed as $w_i = \{1, 2, \ldots, M\}$, a prior probability of the current sample being expressed as $P(w_i)$ and a class conditional probability density being expressed as $P(x|w_i)$; a posterior probability $P(w_i|x)$ of the current sample is calculated by using a Bayesian formula, j represents a subscript of a summation term, n is the total number of classes of the equipment, a class corresponding to a maximum value of the posterior probability is a final classified class, where the posterior probability $P(w_i|x)$ is calculated as follows:

$$P(w_i \mid x) = \frac{P(x \mid w_i)P(w_i)}{\sum_{j=0}^{n} P(x \mid w_j)P(w_j)}.$$

A database module is provided in this disclosure, and feature images of all preset classes of equipment are stored in the database module. Equipment classes and corresponding equipment quantities obtained by matching and classifying in an image are obtained using a classifier. Matched equipment class and quantity are output in a form of text.

Further, after equipment class and equipment quantity finally identified by the camera are obtained, the equipment class and equipment quantity are output so as to cover and match with a preset equipment class and equipment quantity corresponding to a corresponding risk grade rule of the laboratory, and a final matched and corresponding template image for the risk grade rule of the laboratory is output so as to be fused with the real laboratory image, and the alarm information and teaching information are displayed on the fused image.

In one of the preferred embodiments of the present disclosure, a matching mode of the risk grade rule of the laboratory is based on a universal coverage principle, that is, all of equipment classes and equipment quantities identified by the camera must exist in a corresponding risk grade rule of the laboratory. A risk grade rule of a mechanical laboratory is taken as an example in this disclosure.

This kind of experimental place mainly involves pressure vessels and equipment, high-speed equipment, heating equipment, special equipment and other dangerous sources. After the camera takes an image, the system identifies a high-pressure vessel with a pressure greater than or equal to 20 MPa, a boiler with a pressure greater than or equal to 3.8 MPa, equipment with a rotating speed greater than or equal to 30000 r/min, and 6 or more equipment such as any of a traveling crane, plasma equipment, arcing equipment, thermal quenching equipment, forging equipment, an oven, a muffle furnace, a tube furnace, etc., the system may match a first-level risk mode, and red characters "This laboratory is a high-risk laboratory" can be displayed on a mobile application terminal, and information of emergency treatment methods corresponding to a first-level risk laboratory can be displayed.

When in the image recognized by the camera, the system identifies a high-pressure vessel of 10 MPa-20 MPa and a boiler with a pressure of less than 3.8 MPa, a punching press, a metal extrusion hydraulic press, a four-column hydraulic press; equipment with a rotating speed of 10000 r/min-30000 r/min, and 3 to 5 equipment such as any of an oven, a muffle furnace and a tube furnace, the system may match a second-level risk mode, and orange characters "This laboratory is a relative high-risk laboratory" can be displayed on a mobile application terminal, while information of emergency treatment methods corresponding to a second-level risk laboratory can be displayed.

When the system identifies a pressure vessel with a pressure of less than 10 MPa, a high speed, a rotary machinery, a lathe, a drilling machine, a milling machine, a planer, a wire cutting machine, an electrical discharge machine, an injection molding machine, a welding equipment, and 2 or more equipment such as any of an oven, a muffle furnace and a tube furnace, the system may match a third-level risk mode, and yellow characters "This laboratory is a medium-risk laboratory" can be displayed on a mobile application terminal, while information of emergency treatment methods corresponding to a third-level risk laboratory can be displayed. It should be noted that the above-mentioned equipment with different parameters may have different sizes and shapes, so the camera can identify equipment with different parameters and models.

In another preferred embodiment of the present disclosure, the risk grade rule of the laboratory needs a determination standard to determine when the image identified by a current camera meets multiple risk grades: with priorities of various risk grades being set, determining an AR template image corresponding to which laboratory risk grade needs to be output for the currently identified image when the priorities of various risk grades are met, and establishing a first priority risk grade rule and a second priority risk grade rule; and if the equipment class and quantity identified in the collected laboratory image data not only cover an equipment class and quantity corresponding to the first priority risk grade rule, but also cover an equipment class and quantity corresponding to the second priority risk grade rule, the first priority risk grade being higher than the second priority risk grade, directly calling an AR template image corresponding to the first priority risk grade to be fused with the real laboratory image.

In another preferred embodiment of the present disclosure, the method further includes obtaining sensor data. In this embodiment, the sensor data can be obtained by connecting a corresponding sensor through a wireless communication module, so in this embodiment feature extraction can be performed on sensors especially for laboratory equipment with same or very similar appearance features but obviously different functions and parameters, and a risk grade range of the sensor feature data can be further set. If the risk grade of the laboratory corresponding to the equipment class and quantity obtained by image identification is the same as a risk grade of the laboratory where the sensor feature data is located, a AR template image for the same risk grade of the laboratory is output so as to be fused with the real laboratory image to output warning information and teaching information. If the risk grade corresponding to the equipment class and quantity obtained by image identification is different from the risk grade corresponding to the sensor feature data, an AR template image corresponding to a risk grade with a highest risk grade priority is output so as to be fused with the real laboratory image.

In another preferred embodiment of the present disclosure, position and pose adjustment can be performed on virtual equipment corresponding to the AR template image and the equipment image in a real scene, so that transformation from a virtual space coordinate system to a real space coordinate system can be used to determine a position and pose of a virtual object in the real world. In the disclosure, 3D registration technology for tracking a registration module is adopted to realize fusion of the virtual and the real. In the 3D registration technology, a correct matching relationship can be maintained by accurately measuring a position and pose of the camera relative to a real world, in which the transformation from the virtual space coordinate system to the real space coordinate system can be realized with a transformation relation matrix, and the transformation matrix includes:

$$\begin{bmatrix} x \\ y \\ z \\ 1 \end{bmatrix} = V_{4 \times 4} \begin{bmatrix} \xi \\ \eta \\ \zeta \\ 1 \end{bmatrix};$$

in which V is a transformation matrix. A position and pose of an object in the virtual world are set as required, so this matrix is known, where V4X4 is the transformation relation matrix, and x, y and z are transformed values in the real coordinate system, where ξ, η and ζ respectively represent coordinates in the virtual world coordinate system. Because the coordinates in the virtual world coordinate system are preset as required, they are known matrices.

Further, following formula is adopted to match feature points of a video stream:

$$\begin{bmatrix} x' \\ y' \\ z' \\ 1 \end{bmatrix} = \begin{bmatrix} R & T \\ 0 & 1 \end{bmatrix} \begin{bmatrix} x \\ y \\ z \\ 1 \end{bmatrix} = C_{4 \times 4} \begin{bmatrix} x \\ y \\ z \\ 1 \end{bmatrix};$$

Parameters R and T are determined by the position and pose of the camera relative to the real-world coordinate system, and need to be measured in real time, where x, y and z in the second matrix respectively represent coordinates in the real-world coordinate system, and x', y' and z' respectively represent transformed coordinates in a camera coordinate system.

In this disclosure, the matched feature data is further input to a 3D image rendering module and a display output module for fusion, and the 3D image rendering module and the display output module obtain real-time data information of the equipment through the received JSON data, and then a virtual display interface is added to an AR display scene by establishing a UI component in Unity3D, thus completing a purpose of graded management education of laboratory safety risk.

Particularly, according to embodiments of the present disclosure, the process described above with reference to the flowchart may be implemented as a computer software program. For example, an embodiment of the present disclosure includes a computer program product including a computer program carried on a computer readable medium, and the computer program contains program code for executing the method shown in the flowchart. In such an embodiment, the computer program can be downloaded and installed from the network through a communication part, and/or installed from a removable medium. When the computer program is executed by a central processing unit (CPU), the above functions defined in the method of the present application are performed. It should be noted that the above-mentioned computer-readable medium in this application can be a computer-readable signal medium or a computer-readable storage medium or any combination of the above two. The computer-readable storage medium can be, for example, but not limited to, an electronic, magnetic, optical, electromagnetic, infrared, or semiconductor system, apparatus, or device, or any combination of the above. More specific examples of the computer-readable storage media may include, but are not limited to, electrical connections with one or more wire segments, portable computer disks, hard disks, random access memories (RAM), read-only memories (ROM), erasable programmable read-only memories (EPROM or flash memories), optical fibers, portable compact disk read-only memories (CD-ROMs), optical storage devices, magnetic storage devices, or any suitable combination of the above. In this application, the computer-readable storage medium can be any tangible medium containing or storing a program, which can be used by or in combination with an instruction execution system, apparatus or device. In this application, the computer-readable signal medium may include a data signal propagated in baseband or as a part of a carrier wave in which the computer-readable program code is carried. This propagated data signal can take various forms, including but not limited to an electromagnetic signal, an optical signal or any suitable combination of the above. A computer-readable signal medium can also be any computer-readable medium other than a computer-readable storage medium, which can send, propagate or transmit a program for use by or in connection with an instruction execution system, apparatus or device. The program code contained in the computer readable medium can be transmitted with any suitable medium, including but not limited to a wireless segment, an electric wire segment, a fiber optic cable, RF, etc., or any suitable combination of the above.

The flowcharts and block diagrams in the drawings illustrate the architecture, functions and operations of possible implementations of systems, methods and computer program products according to various embodiments of the present invention. In this regard, each block in the flowchart or block diagram may represent a module, a program segment or a part of code containing one or more executable instructions for implementing specified logical functions. It should also be noted that in some alternative implementations, the functions noted in the blocks may also occur in a different order from that noted in the drawings. For example, two blocks in succession may actually be executed in substantially parallel, or they may sometimes be executed in a reverse order, depending on the functions involved. It should also be noted that each block in the block diagrams and/or flowcharts, along with combinations of blocks in the block diagrams and/or flowcharts, can be implemented with dedicated hardware-based systems that perform specified functions or operations, or can be implemented with combinations of dedicated hardware and computer instructions.

It should be understood by those skilled in the art that the embodiments of the present invention described above and shown in the drawings are only taken as examples and do not limit the present invention; the function and structural principle of the invention have been shown and explained in the embodiments; any variation and modification can be made to the embodiments of the invention without departing from the principle.

What is claimed is:

1. A method for AR-based graded management education of laboratory safety risk, comprising:
    collecting a laboratory image data and a sensor data and obtaining a risk grade matching rule of a laboratory;
    identifying an image feature data of the laboratory image data and a sensor feature data of the sensor data, converting the image feature data into a laboratory equipment name after matching and converting the sensor feature data into an equipment model after matching;
    inputting the equipment name and a corresponding equipment model and quantity into the risk grade matching rule of the laboratory, and outputting a risk grade of a current laboratory according to the risk grade matching rule of the laboratory; and according to a present plurality of AR template images for various risk grades, fusing and matching the AR template image corresponding to the identified image feature data and output risk grade to output an alarm information;

wherein identifying the image feature data comprises:

applying a gray threshold T to the laboratory image data using a gray threshold segmentation method, wherein f(x,y) represents a pixel value of a point (x,y) and pixel values of f(x,y) greater than the threshold T are segmented to obtain the segmented image g(x,y); and by using a Hough transform, selecting any point (a,b) within a shape of the segmented image g(x,y) as a reference point, and calculating a tangent direction $\phi$ and an offset vector r to a position of the reference point (a,b) and an included angle $\alpha$ between r and an x axis, from each point on an edge of a graph of an arbitrary shape, wherein calculating the reference point (a,b) is as follows:

$$a = x + r(\phi)\cos(\alpha(\phi))$$

$$b = x + r(\phi)\sin(\alpha(\phi)).$$

2. The method for AR-based graded management education of laboratory safety risk according to claim 1, wherein after the feature extraction is completed, a classifier is further configured to classify extracted features, a classification method comprises:

calculating a total number M of classes of current equipment samples, a current sample class extracted from the sample library being wi={1, 2, . . . , M}, a prior probability of the current sample being expressed as P(wi) and a class conditional probability density of the current sample being expressed as P(x|wi); calculating a posterior probability P(wi|x) of the current sample by using a Bayesian formula, a class corresponding to a maximum value of the posterior probability being a final classified class, j representing a subscript of a summation term, n being the total number of classes of the equipment, where the posterior probability P(wi|x) is calculated as follows:

$$P(w_i \mid x) = \frac{P(x \mid w_i)P(w_i)}{\sum_{j=0}^{n} P(x \mid w_j)P(w_j)}.$$

3. The method for AR-based graded management education of laboratory safety risk according to claim 1, wherein the risk grade matching rule of the laboratory comprises: establishing equipment classes and quantities for various risk grades, calculating equipment classes corresponding to all of the image feature data in a laboratory image identified by a classifier; and if an equipment class identified by the classifier completely cover an equipment class and quantity for a corresponding risk grade, determining that a current laboratory scene is a laboratory matched with covered risk grade rules, and outputting the AR template image corresponding to the risk grade of the laboratory so as to be fused with a real laboratory image.

4. The method for AR-based graded management education of laboratory safety risk according to claim 1, wherein the risk grade matching rule of the laboratory comprises a decision rule for various priorities, and the decision rule for various priorities comprises: establishing a first priority risk grade rule and a second priority risk grade rule; and if an equipment class and quantity identified in the collected laboratory image data not only cover an equipment class and quantity corresponding to the first priority risk grade rule, but also cover an equipment class and quantity corresponding to the second priority risk grade rule, the first priority risk grade being higher than the second priority risk grade, directly calling an AR template image corresponding to the first priority risk grade to be fused with a real laboratory image.

5. The method for AR-based graded management education of laboratory safety risk according to claim 1, wherein the risk grade matching rule of the laboratory comprises: collecting the sensor data, setting a risk grade range of sensor values, and if a collected current sensor value is at a corresponding risk grade, and an equipment class and quantity in the image obtained by a classifier match a same risk grade in the grade range where the sensor data is located, directly outputting a corresponding AR module image with a same risk grade to be fused with a real laboratory image.

6. The method for AR-based graded management education of laboratory safety risk according to claim 1, wherein the risk grade matching rule of the laboratory comprises: collecting the sensor data, setting a risk grade range of sensor values, and if there is difference between a corresponding risk grade where the collected current sensor value is located and a risk grade determined by an equipment class and quantity in the image obtained by a classifier, selecting a risk grade with higher priority to output an AR module image corresponding to the risk grade to be fused with a real laboratory image.

7. A system for AR-based graded management education of laboratory safety risk, wherein the system implements the method for AR-based graded management education of laboratory safety risk according to claim 1.

8. A non-transitory computer-readable storage medium, wherein the non-transitory computer-readable storage medium stores a computer program, and the computer program can be executed by a processor to implement the method for AR-based graded management education of laboratory safety risk according to claim 1.

* * * * *